United States Patent Office 3,070,483
Patented Dec. 25, 1962

3,070,483
METHOD OF INCREASING THE WATER RESISTANCE OF ADHESIVE BONDS
Harland H. Young, Western Springs, and Stewart B. Luce, La Grange, Ill., assignors to Swift & Company, Chicago, Ill., a corporation of Illinois
No Drawing. Filed Apr. 15, 1954, Ser. No. 423,509
4 Claims. (Cl. 156—292)

This invention relates in general to adhesive bonds and their treatment to improve their bonding strength. More specifically, this invention is directed to treatment of moisture-susceptible adhesive bonds with a polyvalent metal salt to decrease the susceptibility to moisture.

Food containers, such as sausage casings, have been formed by bonding sheets of film material together with ordinary adhesives to form a cylinder. The bonds have not withstood the high pressures employed in the stuffing operation, and the casings have often pulled apart at their seams, largely because of the bonds' high sensitivity to moisture. Attempts to overcome this sensitivity by applying a coating of a water-resistant material over the bond have not been entirely satisfactory because the available water-resistant coating materials have not adhered satisfactorily to the smooth sheet material, and moisture passed underneath the coating to weaken the bond. Further, any unusual abrasion removed the coating over the bond and rendered it susceptible to moisture.

Sausage casings have also been manufactured in the past by forming cylinders from film material, such as cellophane, stitching the cylinders at their seam to form seamed casings, and thereafter treating the casings with zinc salt solutions to fuse the layers of cellophane together by virtue of the solubilizing effect of the solution. This method, however, weakens the film material adjacent the seam.

It is therefore an object of the present invention to provide an adhesive bond which has improved moisture resistance.

Another object of the present invention is to provide an adhesive bond which is able to withstand a relatively high pressure.

Another object of the present invention is to provide a method for treating an adhesive bond to render the bond water-resistant.

Another object of the present invention is to provide a seamed artificial sausage casing having a moisture-resistant adhesive bond which is also capable of withstanding the high pressure utilized in the stuffing operation.

Other objects will be apparent to those skilled in the art from the following detailed description.

In its broader concepts, the present invention relates to a method of decreasing the water-sensitivity of water-sensitive adhesive bonds by forming a strong, water-insoluble bond after the adhesive has set. The adhesive bond of the present invention is treated with a solution of a water-soluble, polyvalent metal salt to form the water-resistant adhesive bond. The bond, if desired, may be washed to remove any soluble polyvalent metal salts remaining. The principles of the present invention are directly applicable to increasing the water resistance of an adhesive bond of a seamed food container, such as a seamed sausage casing formed of cellophane.

More specifically, in practicing the invention an adhesive is applied in a narrow band to opposite edges and on opposing sides of a sheet of cellophane. The cellophane sheet is then pressure-sealed in the form of a cylinder by placing the adhesive-coated edges of the cellophane together after the adhesive has partially dried. Drying may be completed either at room temperatures or at elevated temperatures.

The formed, bonded cylinders are then agitated in an aqueous solution of preferably an aluminum, chromic, or ferric salt of about 5% concentration from 2 to 3 minutes. The bonded cylinders are removed from the treating solution and washed with water, if desired, to remove the excess salts. It is not necessary to perform the foregoing washing operation if the resulting food container will not be in direct contact with the food contained therein. However, a food receptacle, such as a sausage casing, which is in direct contact with the sausage ingredients, should be washed to remove any soluble salts present to maintain the purity of the food ingredients.

The basic concept of the present invention involves the formation of a water-insoluble metal salt of the adhesive after the bond has set. The polymer adhesive is applied with relative ease from a water solution, and thereafter the bond is treated to render its non-susceptible to moisture. The salts of iron, chromium, and aluminum, which form stringy precipitates with adhesive polymers having carboxyl groups, such as polyacrylic and polymethacrylic acid, are preferred as the adhesives in sausage casings because of their stringy nature. Of the iron and chromium salts, the chromic and ferric salts yield stronger water-resistant bonds than the ferrous and chromous salts, but the latter are effective to decrease the water susceptibility of the adhesive bonds. The salts of cobalt, antimony, zinc, calcium, and lanthanum also form stringy precipitates and may be used in the instant process. However, cobalt, antimony, and lanthanum salts are toxic and should be used only where the bond is not in direct contact with edible substances. Copper and tin salts of the polymers are also insoluble, but are considered to be inferior.

The principles of the present invention are applicable to increasing the water resistance of an adhesive bond, of the type hereinbefore discussed, of any package of cellophane or equivalent material of which the bond may be a part. Thus the present invention is not limited to the treatment of an adhesive bond of a seamed sausage casing. The method of treating the adhesive bond of a package other than a seamed sausage casing would be identical to the manner of treatment of the present method. Other cellulosic sheet materials, ethyl cellulose and cellulose acetate, have also been bonded successfully by this method.

A 5% solution of the water soluble salt, e.g., aluminum chloride, aluminum sulfate, chromic chloride, or ferric chloride, is the preferred solution strength for treating the bonded casings to insolubilize the adhesive constituents. Higher or lower concentrations may be utilized if desired. As the concentration is increased, the treatment time is decreased and, as the concentration is decreased, the treatment time is increased beyond the 2 to 3 minutes required for 5% solutions.

Adhesive compositions which are excellent bonding agents and which are adapted for practicing the present invention include a 25% aqueous solution of polymerized acrylic acid known as "Acrysol A–1" and a 25% aqueous solution of polymerized acrylic acid known as "Acrysol A–1 High Viscosity."

"Acrysol A–1" is described in a pamphlet of the Rohm & Haas Company, entitled "Preliminary Notes—Acrysol A–1 for Nylon Throwing," dated March 1950. "Acrysol A–1" has a viscosity of 2.2 centistokes in a 5% water solution. "Acrysol A–1 High Viscosity" of the Rohm & Haas Company has a viscosity of 10 centistokes in a 5% water solution.

Examples of additional compositions which are excellent bonding agents and which may be employed in carrying out the present invention include:

Example I

| | Percent |
|---|---|
| "Acrysol GS" | 44.6 |
| "Acrysol A–1 XLV" | 11.1 |
| Acetone | 11.1 |
| Methyl Cellosolve (2-methoxy ethanol) | 5.6 |
| Water | 27.6 |

This formulation was thoroughly mixed at room temperature for a few minutes to insure that all of the ingredients had passed into solution. The composition was then ready for utilization as an adhesive. The pH of this mixture was 4.7.

Example II

| | Percent |
|---|---|
| "Acrysol GS" (12.5% solids) | 42.1 |
| Water | 21.1 |
| 90–10 acetone-methyl Cellosolve by weight | 32.1 |
| Concentrated HCl (sp. g. 1.2) | 4.7 |

The pH of this composition was 2.7. These ingredients were stirred at room temperature for a few minutes to insure that all of the ingredients had been dissolved in the water. The composition was then ready for use as an adhesive.

"Acrysol GS" is a solution of sodium polyacrylate in water and is described in the Rohm & Haas pamphlet "Acrysol GS," dated January 1952. "Acrysol A–1 XLV" (polyacrylic acid), also of the Rohm & Haas Company, possesses a viscosity of 2.2 centistokes in a 5% water solution.

Example III

A polymerized methacrylic acid solution was prepared by heating in a water bath with stirring the following ingredients:

| | G. |
|---|---|
| Methacrylic acid (90% in water) | 444 |
| Water | 1156 |
| Albone (1% $H_2O_2$ based on methacrylic acid) | 11 |

These ingredients were heated with stirring for 1½ hours at 90° C. at the end of which time the mixture had become very thick.

Example IV

Polyacrylic acid may be employed as an adhesive in the same manner as polymethacrylic acid. Polyacrylic acid was mixed with acetone and methyl Cellosolve in the following proportions:

| | Parts |
|---|---|
| Acrysol A–1 (25% aqueous solution) | 20 |
| Acetone | 20 |
| Methyl Cellosolve (2-methoxy ethanol) | 3 |

The mixture was thoroughly mixed at room temperature for a few minutes. The composition was then ready for use as an adhesive.

Mixtures of polymerized acrylic and methacrylic acid and their alkali metal salts may be employed as ingredients. However, if the alkali metal salts are utilized, the ingredients must be rendered at least partially acidic to liberate the polymeric acids to insure a water-resistant salt when the adhesive bond is treated with the polyvalent metal salts. This can best be effected by lowering the pH of the adhesive composition to the acid side of neutral or as low as 2.2 or slightly lower. An acid, such as concentrated hydrochloric acid, can be added to the adhesive composition to lower the pH.

In some of the compositions illustrated by foregoing examples, methyl Cellosolve or an acetone and methyl Cellosolve mixture may be added to improve the free flow of the adhesive as well as to speed up the drying rate of the adhesive and in addition to give a smoother bond with less wrinkling. The amount to be added will depend on the particular requirement of the user. Examples I, II, and IV include these optional ingredients, acetone and methyl Cellosolve, in their formulation.

Tests were conducted on casings prepared in accordance with the principles of the present invention. The results of these tests follow:

Sheet cellophane was pressure sealed with a polymerized adhesive of the composition set forth in foregoing Example I to form cylinders of about 3 inches in diameter. These cylinders were formed into casings about 20 inches in length. One end was tied off and the casings were allowed to stand until the adhesives had dried thoroughly. On pouring water into such a casing of cellophane, the seam burst before the water reached the top. The adhesive had become moistened by water migration through the adhesive layer. In contrast, a cylinder prepared with the same adhesive and treated in a 5% solution of aluminum chloride before filling with water was completely filled the full 20 inch length thereof and held the liquid without leaking for at least 72 hours. Similar results were obtained by the use of aluminum sulfate in place of the aluminum chloride. A single treatment with the aluminum sulfate solution was sufficient to render the bond water-resistant, and after the treatment, the excess soluble aluminum salts were washed away without harming the bond.

Cylinders of cellophane were also prepared with the adhesive composition of Example I using chromic chloride in one case and ferric chloride in another to render the adhesive bond water-resistant. These cylinders were tied off and filled with water. After 72 hours the cylinders still held water.

In the foregoing tests in which the adhesive composition of Example I is utilized as the bonding agent, it has been found that the "Acrysol A–1 XLV," which has a viscosity of 2.2 centistokes in a 5% water solution, does not coagulate sufficiently with the aluminum, chromium, or iron salts and cannot be used by itself. It is utilized with the "Acrysol GS" to reduce the pH of the composition and obtain the effect of the polymeric acid from the sodium salts in the "Acrysol GS." This is a high viscosity acid and, when reformed from the sodium salts, will behave in much the same way as the "Acrysol A–1 High Viscosity" which has a viscosity of 10 centistokes in 5% water solution.

Cylinders were also formed in a like manner as before using "Acrysol A–1 High Viscosity" and the polymerized methacrylic acid composition of Example III as the bonding agents. In the first series of tests, aluminum chloride was used for treating the adhesive bond and, in the second series of tests, ferric chloride. In both series of tests the cylinders held water for extended periods of time.

The present invention is also applicable to other polymer adhesives which contain carboxyl groups. The following examples are illustrative of the adaptation of the present invention to all polycarboxyl adhesives.

Example V

The free acid of carboxymethyl cellulose was prepared by passing a dilute solution of 7.5 g. carboxymethyl cellulose in 792.5 g. distilled water through a tower filled with a high density nuclear sulfonic acid type ion exchange resin (Amberlite IR–120, Rohm & Haas Company). The column was 2 feet long and 1¼ inches in diameter. The original solution pH was 6.0 and after passing the solution through the column the pH was 3.0.

Example VI

A partially hydrolyzed polyacrylonitrile containing both carboxyl and ester groups was diluted with water in the following proportions:

| | G. |
|---|---|
| Water | 500 |
| Partially hydrolyzed polyacronitrile (Monsanto CRD–186) | 25 |

The solutions prepared according to Examples V and VI were employed to adhere the longitudinal seam of a cylinder 3 inches in diameter made from sheet cellophane. After the adhesive had dried, the cylinders were formed into casings about 20 inches in length and one end was tied off. The untreated bond of the adhesive of Example V gave way as the casing was being filled, and the untreated bond of the adhesive of Example VI burst in less than 2 minutes. In contrast, cylinders bonded by each adhesive and treated with a 5% solution of aluminum chloride in the manner described above held water for at least 72 hours.

Obviously, many modifications and variations of the invention as hereinbefore set forth may be made without departing from the spirit and scope thereof, and therefore only such limitations should be imposed as are indicated in the appended claims.

We claim:
1. In a method for increasing the water resistance of an adhesive bond between two edges of a sheet of cellulosic material, said bond comprising a water soluble polymerized acid of the acrylic series, the step which comprises contacting the exposed edge of the adhesive bond with an aqueous solution of a polyvalent metal salt to form a water insoluble adhesive bond.

2. In the method for increasing the water resistance of an adhesive bond between two edges of a sheet of cellulosic material, said bond comprising a water soluble polymerized acid of the acrylic series, the step which comprises contacting the exposed edge of the adhesive bond with an aqueous solution of a water-soluble polyvalent metal salt to form a water insoluble adhesive bond, the cation of said salt selected from the group consisting of aluminum, chromium, iron, cobalt, antimony, zinc, calcium, and lanthanum.

3. A method of forming a seamed sausage casing comprising: bonding two edges of a sheet of cellulosic material selected from the group consisting of cellophane, cellulose acetate, and ethyl cellulose, with an adhesive-water-soluble polymer selected from the group consisting of a polymerized acid of the acrylic series, the free acid of carboxy methyl cellulose, and a partially hydrolyzed polyacrylonitrile to form a cylinder, and contacting the exposed edge of the bond with a solution of a polyvalent metal salt to form a water-insoluble adhesive bond.

4. A method as in claim 3 wherein the polymer is a polymerized acid of the acrylic series.

References Cited in the file of this patent
UNITED STATES PATENTS

| | | |
|---|---|---|
| 1,994,468 | Freeman | Mar. 19, 1935 |
| 2,027,436 | Kallander et al. | Jan. 14, 1936 |
| 2,098,083 | Bowen et al. | Nov. 2, 1937 |
| 2,483,960 | Baer | Oct. 4, 1949 |
| 2,546,705 | Strawinski | Mar. 27, 1951 |
| 2,686,725 | Cornwell | Aug. 17, 1954 |
| 2,776,912 | Gregory | Jan. 8, 1957 |
| 2,784,128 | Schroeder | Mar. 5, 1957 |
| 2,813,055 | Nischk et al. | Nov. 12, 1957 |
| 2,824,821 | Nischk et al. | Feb. 25, 1958 |

OTHER REFERENCES

Vinyl and Related Polymers, Schildknecht, Feb. 20, 1952, page 304.

"The Chemistry of Synthetic Resins," Ellis, volumes I and II, 1935; pages 1072 and 1079.